Figures 2, 3:
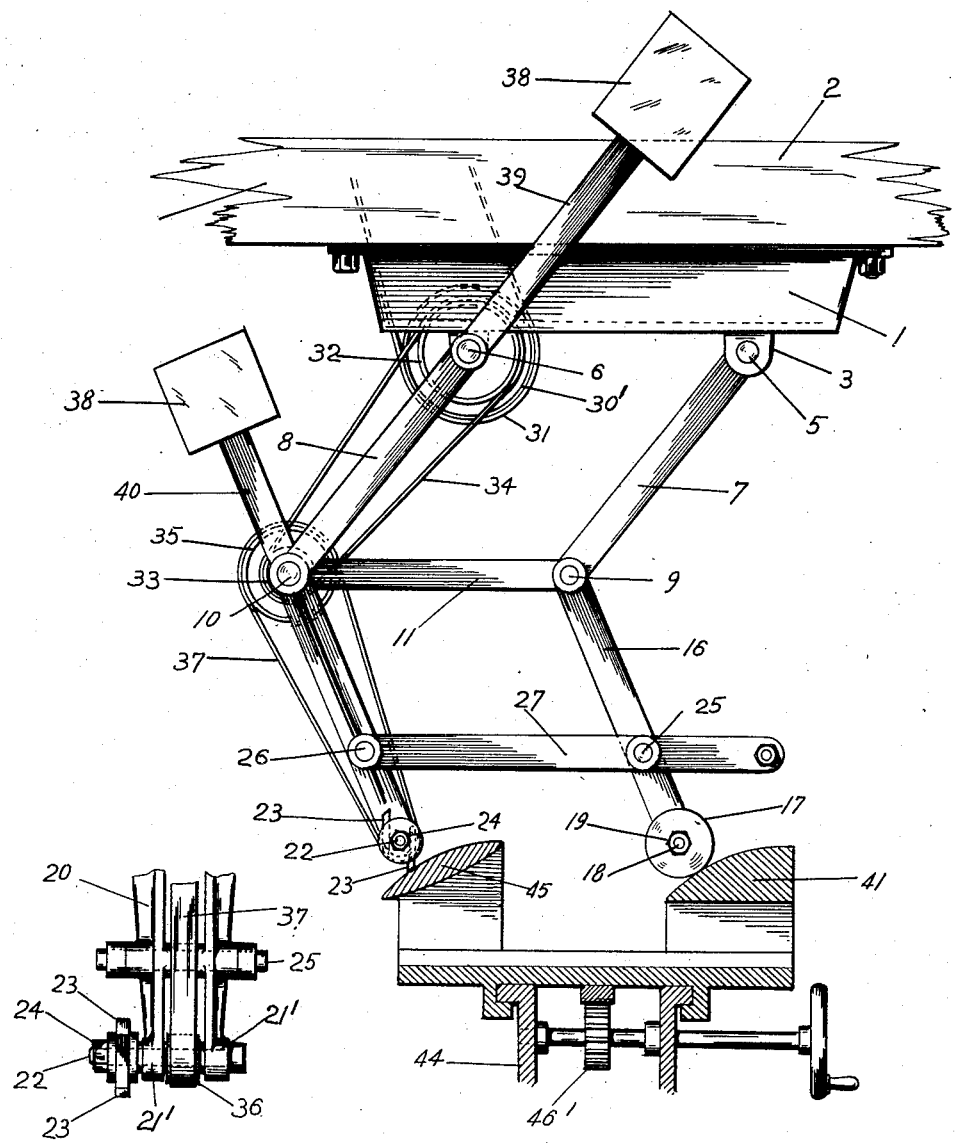

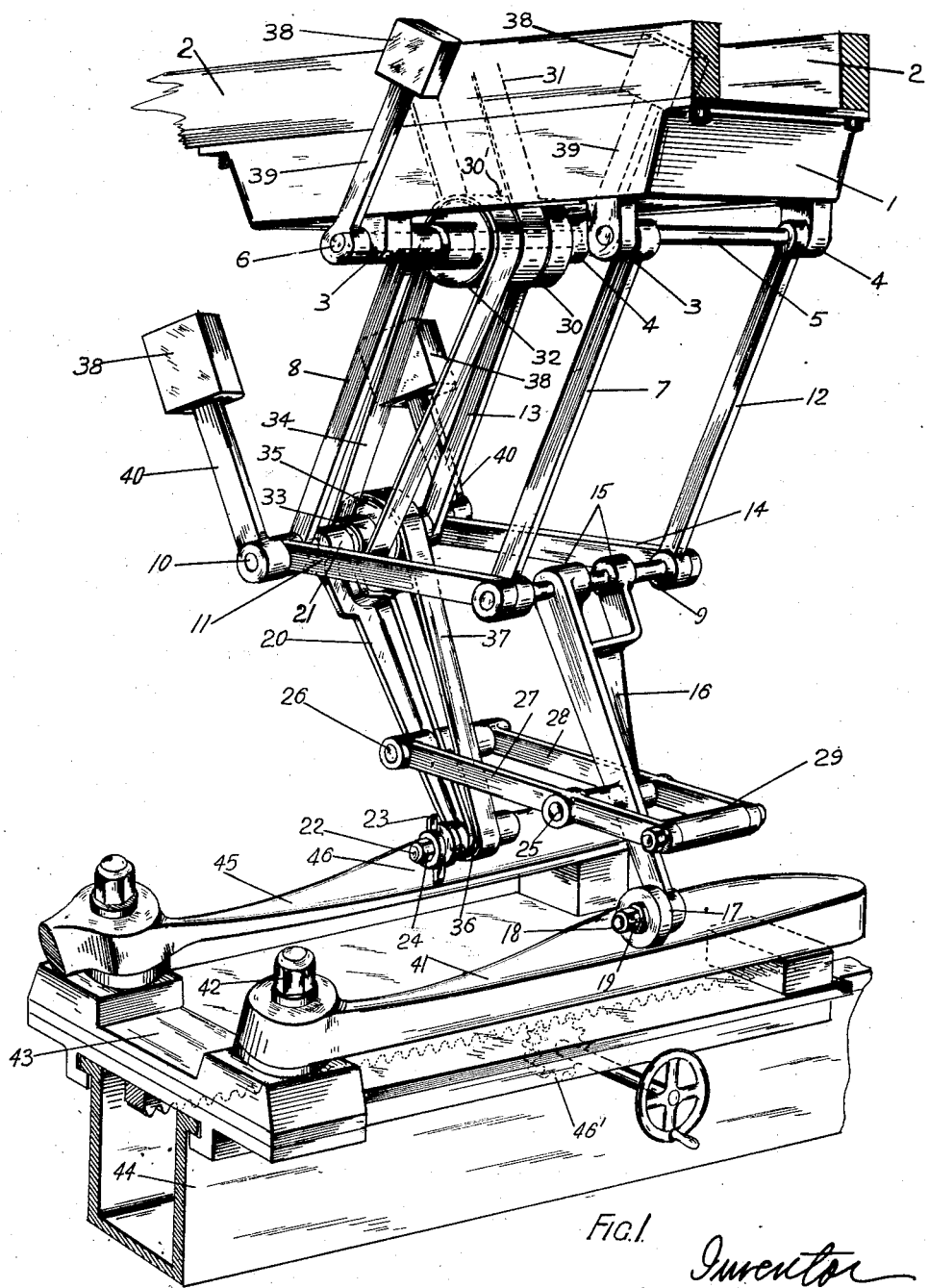

Sept. 29, 1931.　　F. W. DOSE　　1,825,182
MACHINE FOR THE MANUFACTURE OF AIRSCREWS
Filed Nov. 12, 1929　　2 Sheets-Sheet 2

Inventor
Frederich William Dose
By B. Singer, Atty.

Patented Sept. 29, 1931

1,825,182

UNITED STATES PATENT OFFICE

FREDERICK WILLIAM DOSE, OF BEXLEY, NEW SOUTH WALES, AUSTRALIA

MACHINE FOR THE MANUFACTURE OF AIRSCREWS

Application filed November 12, 1929, Serial No. 406,704, and in Australia March 21, 1929.

The invention relates to airscrews and more particularly to machines for the manufacture thereof.

When an airscrew is made by machine the method employed usually comprises transversely milling each side of each blade of a laminated blank by means of a cutting tool which is constrained to follow a path corresponding to the transverse contour of a master blade or block at a corresponding point, both master blade and blank being clamped to a table and the cutting tool or the table fed along as the milling is being carried out, so that the surface of the blade cut from the blank corresponds at all points with the surface of the master blade. Each blade cut from the blank is preferably formed in the above manner from the same blade of the master screw so that the blades of the former must be absolutely identical and in perfect track. When cutting the reverse side of each blade both the blank and the master screw are inverted.

With the machines at present in use a considerable depth of wood is retained upon the shaped blade for hand finishing as the finishing cannot be performed sufficiently accurately by the machine.

The object of the present invention is to provide a machine which will form an airscrew more accurately than hitherto and to such fine limits that little or no extra wood need be left on the blade for hand finishing and the scraping and balancing may be directly performed after the screw has been cut by the machine.

A further object is to provide a machine in which the cutting may be carried substantially to the edge of the blade so that little finishing along either trailing or leading edge is required.

With these objects in view the invention consists in a machine for the purpose set forth comprising a basic member and three links connected thereto to constitute a quadric cycle chain of the parallel double crank type, three other links which form on a quasi fixed member constituted by the link of the said chain opposite the said basic member, a second quadric cycle chain of the parallel double crank type, a roller on an extension of one link of the second chain adjacent the said quasi fixed member, a cutter on an extension of the opposite link of the second chain and means for driving said cutter.

The above stated quadric cycle chains may conveniently be duplicated for the sake of lateral rigidity by a second set of similar links mounted upon shafts which constitute the pivotal points of the first mentioned links.

The above stated basic member is preferably a horizontal frame secured to a roof bracket or the like with the adjacent links depending therefrom, but the invention is not confined to such configuration of the member.

It is preferred that the blank from which the blade is cut is progressed or fed under the machine, but the reverse arrangement, with the blank stationary and the machine progressed or fed could be used, in which case the basic member of the quadric cycle chain is not stationary but has a feeding motion.

In order to more fully describe the invention reference will now be had to the drawings which depicts a preferred form of a machine according to this invention, and in which Fig. 1 is a perspective view thereof, in operative relation to an airscrew blank, Fig. 2 is an elevation thereof and Fig. 3 is a detailed view of the cutter mechanism.

The machine comprises a rectangular roof frame 1 horizontally mounted on the underside of two roof beams 2, 2 and having formed on one of its sides two depending bearings lugs 3, 3 and on its other side two depending bearing lugs 4, 4 opposite to and corresponding with lugs 3, 3. A transverse shaft 5 is carried at either end in one of the bearing lugs 3 and one of the bearing lugs 4, while a second transverse shaft 6 is similarly carried in the other bearing lugs 3 and 4.

Pivotally mounted at one end on shafts 5 and 6 respectively and adjacent lugs 3, 3 are two identical depending links 7 and 8 which have pivotally mounted to their lower ends, on transverse shafts 9 and 10, a horizontal link 11 with centres equal to the distance between the centres of lugs 3, 3.

Two depending links 12 and 13 identical with links 7 and 8 are pivotally mounted at one end on shafts 5 and 6 respectively adjacent to lugs 4, 4 and have pivoted to their lower ends a horizontal link 14 identical with link 11, the latter link and the lower ends of links 12 and 13 being pivotally mounted on the ends of shafts 9 and 10 respectively remote from link 11.

Links 7, 8 and 11 with frame 1 form a quadric cycle chain of the parallel double crank type and links 12, 13 and 14 with frame 1 form a similar chain coupled to the first mentioned chain by shafts 5, 6, 9 and 10.

It will be understood that although the said quadric cycle chains are kinematically of the parallel double crank type on account of the equality of links 7 and 8 and of link 11 and a fixed member constituted by frame 1, actually rotation of links 7 and 8 (and also links 12 and 13) is prevented by the construction of frame 1 and the links merely oscillate about their pivotal points.

Thus it will be seen that link 11 and the coupled corresponding link 14 are horizontal (and parallel with frame 1) for any configuration of the chains within the limits of their movement.

Pivotally mounted about the central portion of shaft 9 is the fork end 15 of a depending link 16 which rotatably carries, on a stub shaft 18 mounted in its lower end, a roller 17 retained on the stub shaft by a nut 19. A link 20 has a forked upper end 21 which is pivotally mounted about the central portion of shaft 10 and rotatably carries in a forked lower end $21^1$ a stub shaft 22 upon one end of which is mounted a rotary milling cutter 23 in alignment with roller 17, the cutter being clamped to the shaft by a nut 24 in known manner (see Fig. 3). The distances between the centres of shafts 10 and 22 and between shafts 9 and 18 are equal.

Intermediate its ends link 16 has mounted in it a transverse rod 25 and link 20 also has mounted in it, at a distance from shaft 10 equal to the distance of rod 25 from shaft 9, a transverse rod 26.

Pivotally mounted on one end of rod 25 and one end of rod 26 is a horizontal link 27 with centres equal to the centres of link 11 and pivotally mounted on the other ends of these rods and with the same centres is a link 28; links 27 and 28 are extended past link 16 and joined at these ends by a short transverse handle piece 29 for manual guidance of the machine.

Links 27, 20 and 16 form, on link 11, a quadric cycle chain of the parallel double crank type, and link 28 in combination with links 16 and 20 form, on link 14, a similar chain.

Links 11 and 14 are not actually fixed links necessitated by a quadric cycle chain, but are constrained to follow a certain path and therefore constitute quasi-fixed links of the chain.

Thus it will be seen that for all configurations of the link work within its limits, links 27 and 28, links 11 and 14 and frame 1 are all parallel and link 16 is parallel with link 20; thus cutter 23 is constrained to follow a path identical with any path traced out by roller 17 and will cut from a blank with which it comes in contact a surface identical with a surface followed by roller 17.

In order to drive cutter 23 there are rotatably mounted upon shaft 6 intermediate the links 8 and 13 three pulleys 30, $30^1$ and 32, of which pulley 30 is an idler and pulleys $30^1$ and 32 are connected together. A belt 31 driven from a source of power (not shown) is reeved about pulley 30 when it is not desired to drive the machine, or about pulley $30^1$ when drive is desired; in this capacity pulleys $30^1$ and 30 functions as fast and loose pulleys, as the former is connected to pulley 32, although both revolve freely upon the shaft. In the drawings belt 31 is shown reeved about pulley $30^1$, in which position the drive is being transmitted to the machine. A small pulley 33, rotatably mounted on shaft 10, is driven from pulley 32 by a belt 34 and is connected to a larger pulley 35 also rotatably mounted on shaft 10, which in turn drives a small pulley 36, rigidly mounted on shaft 22 intermediate the fork end $21^1$ of link 20 through a belt 37.

The belt drive to the cutter 23 is therefore independent of the configuration of the linkwork and provides a double increase in gearing, from larger pulley 32 to smaller pulley 33 and from larger pulley 35 to smaller pulley 36.

The weight of the link work on the cutter 23 and roller 17 is compensated as required by balance weights 38, 38 adjustably mounted in known manner on levers 39, 39 and 40, 40 secured respectively to shafts 6 and 10.

The distance of shaft 22 from rod 26 and the distance of shaft 18 from rod 25 are equal and the diameter of the outer periphery of cutter 23 is equal to the diameter of roller 17.

In use, a master blade or block 41 is clamped as at 42 and otherwise suitably supported in known manner longitudinally upon a horizontal table 43 slidable longitudinally upon a base 44, and an air screw blank 45 (half only of which is shown) is similarly clamped on the table with the longitudinal centre lines of the blank and master blade parallel, the same height above the table and spaced a distance equal to the distance between the centre lines of shafts 22 and 18, and otherwise suitably trued up.

For the sake of rigidity the master blade or block is of considerable thickness, much thicker than the screw blade to be formed, and its opposite surfaces are shaped respectively to correspond with the required contour of the respective surfaces of the screw blade. This construction of the master block is preferred as the block merely requires inversion when the reverse side of the screw blade is to be shaped. Alternatively separate master blades or blocks shaped on one surface only may be provided for use in shaping the respective surfaces of the screw blades, and substituted one for the other as required.

The cutter is then driven and the roller drawn or pushed laterally across the master blade, causing the cutter to cut in the blank as at 46 a path identical with the contour of the master blade at the point of contact of the roller.

The table is fed along, carrying with it the blank and master blade, by means of a suitable rack and pinion gear $46^1$ of known type as further cuts are taken.

When one side of the blank has been cut the blank and the master blade are inverted and the other side of the blank is cut to form one blade. The same operation is performed on the other end of the blank to form the other blade thereon from the same master blade.

Alternatively the cutter and the roller may be traversed longitudinally upon the blank and master blade respectively by suitable positioning of the table and the blank and master blade relative to the machine.

What I claim and desire to secure by Letters Patent is:—

1. A machine for the purpose set forth, comprising three links and a fixed member constituting a quadric cycle chain of the parallel double crank type, three other links which form, on a quasi fixed member constituted by the link of the said chain opposite the first mentioned fixed member, a second quadric cycle chain of the parallel double crank type, a roller mounted on an extension of one link of the second chain which is adjacent the quasi fixed member, a cutter mounted to rotate on a similar extension of the opposite link of the second chain, said roller and cutter being rotatable in a plane parallel to the plane of the linkwork, and a belt drive which is mounted upon the linkwork and supplies constant drive ratio to the cutter independently of the configuration of the linkwork.

2. A machine according to claim 1 and including a second set of links which respectively are duplicates of the links of the first mentioned chain and which form an equivalent quadric cycle chain similar to, spaced from, and connected to the other quadric cycle chain.

Signed at Sydney this eighth day of October A. D. 1929.

FREDERICK WILLIAM DOSE.